(No Model.)
S. P. TALLMAN.
Automatic Car Brake.
No. 235,916.                     Patented Dec. 28, 1880.
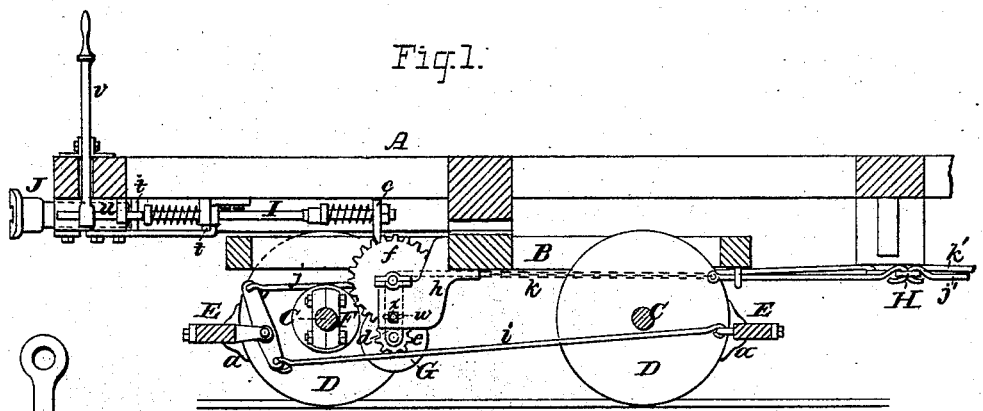
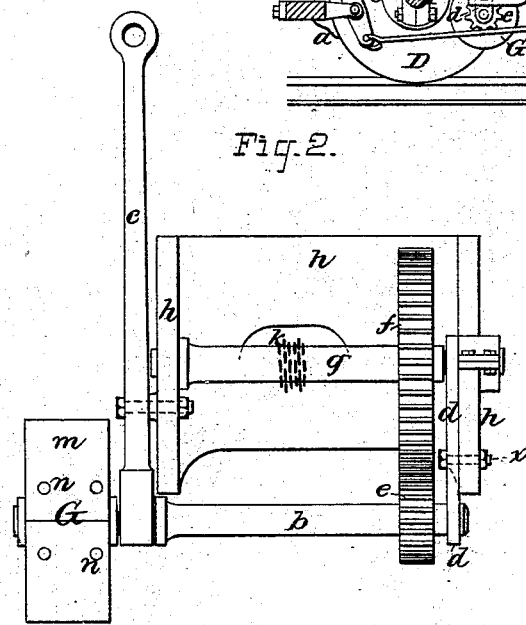
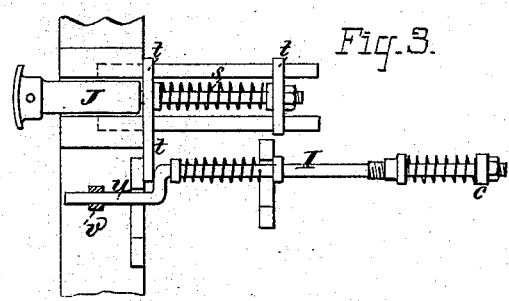
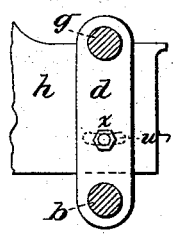
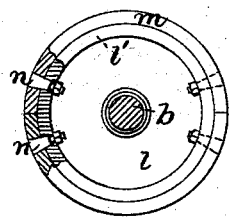
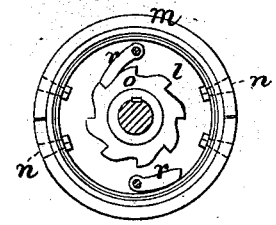
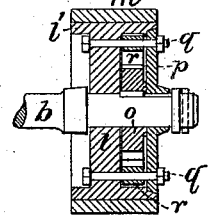
ATTEST:                         INVENTOR:
Julian A. Hurdle.               Stephen P. Tallman,
A. M. Fraser.                   By his Attys—
                                Burke, Fraser & Connell

UNITED STATES PATENT OFFICE.

STEPHEN P. TALLMAN, OF DUNELLEN, NEW JERSEY.

AUTOMATIC CAR-BRAKE.

SPECIFICATION forming part of Letters Patent No. 235,916, dated December 28, 1880.

Application filed June 9, 1880. (No model.)

*To all whom it may concern:*

Be it known that I, STEPHEN P. TALLMAN, a citizen of the United States, residing at Dunellen, in the county of Middlesex and State of New Jersey, have invented certain Improvements in Automatic Car-Brakes, of which the following is a specification.

This invention relates to improvements on the car-brake described in my patent of December 2, 1879, numbered 222,163, and the peculiar features of the said invention will be more particularly described hereinafter with reference to the accompanying drawings, in which—

Figure 1 is a longitudinal vertical section of a car-truck and platform provided with my improvements. Fig. 2 is a detached front view of the braking mechanism. Fig. 3 is a plan view, showing the draw-bar and push-bar. Figs. 4, 5, and 6 are detached views of the ratcheted friction-pulley, and Fig. 7 is a detached view of the bracket in which the pulley-shaft is mounted. Fig. 1 is drawn to a smaller scale than the other figures.

This invention belongs to that class of brakes for railway-cars in which the checking of the engine and the consequent closing of the cars upon each other by their momentum serve to set the brakes upon the wheels, and it will not be necessary for me to go fully into the details of the construction and operation of the brake so far as they are similar to those described in my patent before mentioned. I will therefore briefly refer to the parts common to both, and then proceed to point out the improvements.

A represents the base-frame or platform of a car, and B the truck-frame under one end of the same. C C are the axles, D D the truck-wheels, and E E the ordinary brake-bars provided with shoes $a\ a$. These may be arranged between the pairs of truck-wheels, or outside, as shown.

F is a friction-pulley mounted on one of the car-axles, and G is the friction-pulley mounted on a shaft, $b$, one end of which has a bearing in a pendent lever, $c$, and the other a bearing in an adjustable bracket, $d$, which will be more particularly hereinafter described. On the shaft $b$ is fixed a wheel or pinion, $e$, arranged to mesh with a toothed wheel, $f$, fixed to a windlass barrel or shaft, $g$, which is mounted in bearings in the bracket $h$, bolted to the truck-frame.

From one end of a pivoted lever hung to the end brake-bar a rod, $i$, extends to and takes hold of the other brake-bar, and from the other end of said pivoted lever another rod, $j$, extends to and takes hold of an evener, H, pivoted or hung to the under side of the car. From the other end of this evener a bar and chain, $k$, extends back to the windlass $g$, upon which it is wound when the brakes are set.

In this construction each end of the car is provided with brake mechanism like that shown in the figures; but it is deemed unnecessary to show more than one.

A rod, $j'$, extends from the evener, the pivoted lever on the brake-bar at the opposite end of the car, and a rod or chain, $k'$, extends from the opposite end of the evener to the windlass at the opposite end of the car.

I is a push-bar, the rear end of which passes through an eye in the upper end of the lever $c$, and is provided with a cushion-spring and set collar or nut, similar to those shown in my former patent, before mentioned.

So far as above described the brake is constructed and arranged in a manner similar to that in my former patent. I will now describe the novel features of the invention.

In a patent granted to me August 26, 1879, No. 218,838, I showed the friction-pulley ratcheted on the shaft; but in my later patent, before mentioned, this pulley was fixed to the shaft and the ratchet was placed in one of the gear-wheels. In both cases, however, the pawl was held up to the ratchet by means of a spring. I find in practice that this constant pressure of the pawl on the ratchet-teeth causes undue wear and a disagreeable clicking noise, and that the springs employed are apt to break. I also find that the face of the pulley wears away from the excessive friction, and frequent renewal is required. Therefore, to obviate these defects, I construct the pulley G as shown in Figs. 4, 5, and 6, $l$ being the web, $l'$ the rim, and $m$ a shoe or tire, made in one or more pieces and secured to the rim by means of conical bolts $n\ n$. This shoe may be readily removed and replaced when worn, and the tapered bolts always maintain their hold and preserve a smooth surface despite the wear on the shoe. The rim $b'$ of the pulley overhangs the web, (see Fig. 6,) so as to form a recess to receive the ratchet $o$, which is fixed on the shaft, the pulley rotating loosely thereon; and $p$ is a plate which covers this recess and keeps out the dust. This plate is held in place by two bolts, $q\ q$, which I utilize as studs on which to hang two gravity-pawls, $r\ r$, adapted to engage the teeth of the ratchet. There may be one or more pawls; but I prefer two. In their operation only one of the pawls will generally be engaged at a time, and in backing they will only rest lightly upon the ratchet. With respect to the above-described arrangement of two gravity-pawls, it will be observed that when the friction-pulleys are brought together and the pulley G begins to revolve, (the ratchet being stationary,) if both pawls are disengaged the pulley cannot make more than one-quarter of a revolution before one of the pawls will be brought to the top and allowed to fall upon and engage the ratchet, and this loss of a quarter-revolution is immaterial. If more than two pawls are employed, the loss will be proportionately less. The pawls should turn freely on their studs, so as to insure their proper engagement with the ratchet. I may, of course, employ but one gravity-pawl; but in that case there might be a half-revolution before the pawl would engage. If the ratchet be placed in the gear-wheel $f$, the same arrangement of the pawls may be employed. The fixed friction-pulley may also be provided with a shoe or tire like that just described.

In my patent of December 2, 1879, before mentioned, I arranged the head of the push-bar to engage a lug projecting laterally from the draw-bar, so that when the draw-bar should be driven in by the closing together of the cars the push-bar would also be driven in. I find, however, that in many, if not all, cars, the draw-bar has considerable lateral swing or movement, and that this is apt to interfere materially with the operation of the push-bar. I therefore employ the construction best shown in Fig. 3, wherein J is the draw-bar, provided with the usual spring, $s$, and spring-plates, $t\ t$. The forward spring-plate is made to project laterally farther than usual, and the head of the push-bar I takes behind this plate when the brake is in operative condition. As these spring-plates have no lateral movement, the push-bar will not be disturbed in its functions when arranged in this manner, and as the forward spring-plate follows the movements of the draw-bar in and out, the proper movement of the push-bar is assured.

To properly engage and disengage the push-bar, I employ means very similar to that shown in my before-mentioned patent—that is, I prolong it, as at $u$, and carry it forward, supporting it in guides that permit some lateral movement. This movement may be effected by means of a lever, $v$, mounted on the car, and its lower end forked or slotted to receive the prolongation $u$.

I prefer to arrange the push-bar to stand directly behind the spring-plate when in operative condition, so as to insure the pressure being in the direction of its axis, as shown; but it might stand to one side, in the same vertical plane with the prolongation $u$, and have a lateral projection to engage the spring-plate.

In applying my brake to old cars I find it necessary to provide some means of adjusting the shaft $b$ with relation to the car-axle so that the two friction-pulleys may stand normally in their proper relative positions. This is accomplished by the device best shown in Figs. 2 and 7, in which the shaft $b$ is shown as having a bearing in a hanger or bracket, $d$, suspended on the journal of the windlass $g$, and lying close against the inner face of the fixed bracket $h$. This bracket has a curved slot, $w$, and a bolt, $x$, which passes through the bracket $d$, and said slot serves to clamp the two together in any required position within limits.

Having thus described my invention, I claim—

1. The combination of the pulley G, the tire or shoe $m$, the conical fastening-bolts, the plate $p$, bolts $q\ q$, gravity pawl or pawls $r$, ratchet $o$, and shaft $b$, all arranged substantially as set forth.

2. The combination of the windlass barrel or shaft $g$, the pulley-shaft $b$, the fixed bracket $h$, provided with the slot $w$, the adjustable bracket $d$, hung from the shaft $g$, and the clamping-bolt $x$, all arranged substantially as and for the purposes set forth.

3. The combination, with the draw-bar and its spring, of the spring-plates $t\ t$, the forward one laterally prolonged, and the push-bar I, arranged to take behind the prolongation of the spring-plate, and provided with suitable means whereby it may be disengaged from the said plate, substantially as set forth.

In witness whereof I have hereunto signed my name in the presence of two subscribing witnesses.

STEPHEN P. TALLMAN.

Witnesses:
HENRY CONNETT,
A. M. FRASER.